(12) United States Patent
Braithwaite (10) Patent No.: US 7,742,535 B2
(45) Date of Patent: Jun. 22, 2010

(54) CREST FACTOR REDUCTION SYSTEM AND METHOD FOR OFDM TRANSMISSION SYSTEMS USING SELECTIVE SUB-CARRIER DEGRADATION

(75) Inventor: Richard Neil Braithwaite, Orange, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 854 days.

(21) Appl. No.: 11/642,281

(22) Filed: Dec. 19, 2006

(65) Prior Publication Data

US 2007/0140367 A1 Jun. 21, 2007

Related U.S. Application Data

(60) Provisional application No. 60/752,441, filed on Dec. 21, 2005.

(51) Int. Cl.
*H04L 27/28* (2006.01)
*H04L 25/49* (2006.01)
(52) U.S. Cl. .................................. 375/260; 375/296
(58) Field of Classification Search ................. 375/260, 375/261, 295, 296, 297, 298, 308; 370/203, 370/207, 208, 210
See application file for complete search history.

(56) References Cited

U.S. PATENT DOCUMENTS

| | | | |
|---|---|---|---|
| 5,636,247 A | 6/1997 | Kamerman et al. | |
| 6,175,551 B1 | 1/2001 | Awater et al. | |
| 7,023,930 B2 | 4/2006 | Clausen | |
| 7,292,639 B1 * | 11/2007 | Demirekler et al. | 375/260 |
| 7,409,009 B2 | 8/2008 | Akhtman | |
| 2002/0061068 A1* | 5/2002 | Leva et al. | 375/260 |
| 2004/0156442 A1 | 8/2004 | Clausen | |
| 2004/0218689 A1 | 11/2004 | Akhtman | |
| 2007/0058743 A1* | 3/2007 | Hunton | 375/260 |
| 2007/0116142 A1* | 5/2007 | Molander | 375/260 |
| 2008/0043616 A1* | 2/2008 | Clausen et al. | 370/210 |

OTHER PUBLICATIONS

International Search Report for PCT/US06/048726 mailed Dec. 3, 2007.
Andersen, "Crest Factor Analysis for Complex Signal Processing: Understanding the Complexities of Summing Digital Signals." RF Design [online] Oct. 2001, pp. 40, 42, 44, 46, 48, 50, 52, 54, 56. (Internet http://rfdesign.com/images/archive/1001Andersen40.pdf).

* cited by examiner

*Primary Examiner*—Betsy L Deppe (57) ABSTRACT

A system and method for crest factor reduction of OFDM transmission systems using selective sub-carrier degradation, is disclosed. A modulated communications signal comprising a series of symbols is converted into parallel format in groups of plural symbols in the frequency domain. Crest factor reduction reduces a primary peak of the groups of plural symbols by selective sub-carrier degradation, to generate peak reduction symbols. The groups of plural symbols are converted into time domain symbols, and combined with the peak reduction symbols to provide peak reduced symbols in time domain.

22 Claims, 8 Drawing Sheets

CREST FACTOR REDUCTION SYSTEM AND METHOD FOR OFDM TRANSMISSION SYSTEMS USING SELECTIVE SUB-CARRIER DEGRADATION

RELATED APPLICATION

This application claims the benefit under 35 U.S.C. 119 (e) of U.S. provisional patent application Ser. No. 60/752,441, filed on Dec. 21, 2005, incorporated herein by reference in its entirety.

FIELD OF THE INVENTION

This invention relates to the field of wireless communications systems and methods.

BACKGROUND OF THE INVENTION

Orthogonal Frequency Division Multiplexing (OFDM) is a transmission scheme which spreads the signal to be transmitted over a number of separate orthogonal sub-carriers. OFDM transmission has several advantages including high spectrum efficiency and resistance to multi-path interference. Accordingly, OFDM is a desirable transmission scheme for many wireless transmission applications. However, OFDM waveforms can have large peak-to-average power ratios (PAPR's). Large peaks cause problems because the power amplifiers used in the transmitter become less efficient as the peak-to-average power ratio (PAPR) of the RF signal increases. In addition, the finite dynamic range of the DAC's in the transmission system place limits on the PAPR. As a result, it is desirable to limit the PAPR to allow for more efficient design of the transmitter. This process is referred to as crest factor reduction (CFR).

CFR can be accomplished in various manners. The direct method is to clip peaks exceeding a specified level. This has the effect of moving the constellation elements of the transmitted data symbols from their assigned positions in the modulation scheme. The difference between the actual and assigned positions in the IQ space is referred to as the "constellation error" or "error vector magnitude" (EVM). The allowable relative constellation RMS error, averaged over sub-carriers, frames, and packets, is dependent on the rate modulation (where the most difficult specification is −31.0 dB for the ¾ rate 64-QAM). Clipping tends to distribute the constellation error over all the sub-carriers including null sub-carriers and pilot sub-carriers (used for frequency synchronization). In general, it is beneficial for the receiver to have accurate pilot information to minimize the bit error rate (BER). Although the constellation error is specified, the primary goal is to minimize the BER.

Other methods for CFR attempt to randomize the phase of the sub-carriers. These include "partial transmit sequence" (PTS) and "selective mapping" (SLM). The sub-carriers are multiplied by a set of different phase vectors producing a set of potential time sequences. The time sequence with the lowest PAPR is transmitted. Information regarding the phase vector used must be sent to the receiver to allow demodulation.

Another class of methods for CFR uses some of the data carriers as peak reducers. This includes "tone reservation." Once a peak is detected in the time domain, the phase of the reserved sub-carriers are selected to reduce the peak. This results in a lost of bandwidth because less data sub-carriers are available. Information regarding the active data sub-carriers must be sent to the receiver.

Another method for CFR is to alter the constellation so that elements are not unique. This is referred to as "constellation extension." Elements are mapped so that $d_{IQ}=-d_{IQ}$. The downside of this approach is that one bit is lost in the constellation mapping which reduces the throughput for the QPSK, 16-QAM, and 64-QAM to ½, ¾, and ⅚ of the original value, respectively. In addition, the Gray code mapping specified in the standard would have to be abandoned.

Accordingly, a need presently exists for a system and method to reduce PAPRs in an OFDM transmitter while avoiding the above noted problems of existing CFR approaches.

BRIEF SUMMARY OF THE INVENTION

In a first aspect the present invention provides an OFDM communications system, comprising an input receiving a modulated communications signal comprising a series of symbols, a serial to parallel converter for converting the symbols into parallel format in groups of plural symbols in the frequency domain, a circuit that receives said groups of plural symbols and converts them into time domain symbols, a crest factor reduction circuit that receives said groups of plural symbols and reduces a primary peak therein by selective sub-carrier degradation to generate peak reduction symbols, a circuit for converting the peak reduction symbols into time domain peak reduction symbols, a combiner circuit for combining the peak reduction symbols with the time domain symbols to provide peak reduced symbols in time domain, and a cyclic extension circuit for performing a cyclic extension operation on the time domain peak reduced symbols.

In a preferred embodiment, the system further comprises a circuit for determining a peak to average power ratio (PAPR) from the time domain symbols wherein the combiner includes a selector that selects a time domain symbol if the PAPR is less than a certain value, otherwise, the selector selects a peak reduction symbol. The system further comprises a peak finder for identifying the primary and secondary peaks within the time domain symbols, wherein based on the identified primary and secondary peaks, the crest factor reduction circuit reduces the primary peak, while not increasing the secondary peaks, in the groups of plural symbols in the frequency domain, to generate peak reduction symbols.

In another embodiment, the crest factor reduction circuit includes a circuit for reducing the primary peak by bit reversal for sub-carriers with a positive correlation to the primary peak and secondary peaks. The circuit for reducing the primary peak by bit reversal changes the sign of the I-component or Q-component for a sub-carrier that has an outer element and a positive correlation to the primary peak, for reducing the primary peak.

In another embodiment, the crest factor reduction circuit includes a circuit for reducing the primary peak by outward enhancement. The circuit for reducing the primary peak by outward enhancement increases the I-component or Q-component magnitude for all sub-carriers having an outer modulation constellation element and a negative correlation to the primary peak.

In another embodiment, the crest factor reduction circuit includes a circuit for reducing the primary peak using the phase profiles of the primary and secondary peaks to offset all modulation constellation elements for the groups of plural symbols. The system further comprises a circuit for computing the phase profiles of the primary and secondary peaks to determine the magnitude and direction of the offset of the element associated with each sub-carrier for optimal peak reduction.

The system further comprises a parallel to serial converter for converting the time domain peak reduced symbols from parallel to serial format to provide a peak power reduced digital OFDM communications signal.

In another aspect the present invention provides a method for peak power reduction of an OFDM wireless communications signal, comprising receiving an OFDM signal comprising groups of plural symbols, reducing a primary peak in the groups of plural symbols by selective sub-carrier degradation to generate peak reduction symbols, converting the peak reduction symbols into time domain peak reduction symbols, converting the received groups of plural symbols into time domain symbols, combining the peak reduction symbols with the time domain symbols to provide peak reduced symbols in time domain, and performing a cyclic extension operation on the time domain peak reduced symbols.

In one preferred embodiment, reducing a primary peak further includes reducing a primary peak in the groups of plural symbols while not increasing secondary peaks. In a preferred embodiment, the method further comprises the step of determining a peak to average power ratio (PAPR) from the time domain symbols, wherein the step of combining further includes selecting a time domain symbol if the PAPR is less than a certain value, otherwise, selecting a peak reduction symbol.

In another embodiment, the step of reducing the primary peak further includes reducing the primary peak by bit reversal for sub-carriers with a positive correlation to the primary peak and secondary peaks. Reducing the primary peak further includes reducing the primary peak by bit reversal changes to sign of the I-component or Q-component for a sub-carrier that has an outer element and a positive correlation to the primary peak, for reducing the primary peak.

In another embodiment, the step of reducing the primary peak further includes reducing the primary peak by outward enhancement. Reducing the primary peak further includes reducing the primary peak by outward enhancement that increases the I-component or Q-component magnitude for all sub-carriers having an outer modulation constellation element and a negative correlation to the primary peak.

In another embodiment, the step of reducing the primary peak further includes reducing the primary peak using the phase profiles of the primary and secondary peaks to offset all modulation constellation elements for the groups of plural symbols. The method further comprising the steps of computing the phase profiles of the primary and secondary peaks to determine the magnitude and direction of the offset of the element associated with each sub-carrier for optimal peak reduction.

DETAILED DESCRIPTION OF THE INVENTION

The present invention provides a CFR system and method for providing improved peak reduction in OFDM transmission systems. Accordingly, the present invention further provides an improved OFDM transmission system.

Crest factor reduction is an approach that reduces the peaks at the expense of in-band errors. Usually this degradation is distributed through the frequency bandwidth of the signal. However, since the OFDM signal is created in the Fourier domain, it is possible to concentrate the degradation to specific sub-carriers (frequency bins of the FFT).

The disclosed CFR approaches modify selected sub-carriers within an OFDM symbol. Pilot sub-carriers are not modified. For the case of sub-carriers modulated using 16-QAM or 64-QAM, the selected sub-carriers are limited to those with data elements on the outer boundary of the constellation. These outer boundary constellation elements have two useful properties that can be exploited. Gray code bit mapping means that a single bit error will move the element to a neighboring position in the constellation, except for the outer elements. For outer elements, a bit error can cause the element to wrap-around either the real or imaginary axis and appear at the opposite side of constellation. Thus, large phase changes can be introduced at the expense of one bit error. The second property of the outer elements is that the demodulator does not surround the element with four decision boundaries, as in the case for the interior elements. If the element is pushed further outwards in the constellation space, such that it is not any closer to the active decision boundaries, the BER will not change.

In the first approach, a bit error is introduced intentionally to move a data element to the opposite side of the constellation (opposite relative to the real or imaginary axis, not the origin). After the bit error, the data element is still on the outer boundary of the constellation. By selecting the correct sub-carrier(s) for the bit error, the peak in the time domain will be reduced.

The second approach also selects sub-carriers whose data element lies on the outer boundary of the constellation. The magnitude of either the real or imaginary component of the data element is increased. Although the EVM increases, it should not have an effect on the BER because the element is no closer to any of the decision boundaries. The total transmitted power however will increase. By selecting the correct sub-carrier(s), the peak in the time domain will be reduced. Both of the above-mentioned approaches are effective when used in moderation.

A third approach uses all of the data sub-carriers. It increases the EVM and can increase the BER. However, since more sub-carriers are available, some CFR can be obtained while keeping the EVM small.

In the preferred embodiment, crest factor reduction is used sparingly with the goal of bounding the PAPR when transmitting at high power levels, as opposed to obtaining the maximum PAPR reduction. The bound is met while minimizing BER without deviating from the standard. This peak power bound allows the power amplifier to be designed for greater efficiency. In some applications it may be necessary to enforce a second PAPR bound for all power levels if the dynamic range of the DAC is not sufficient to avoid clipping of all possible signals.

Figure 1:
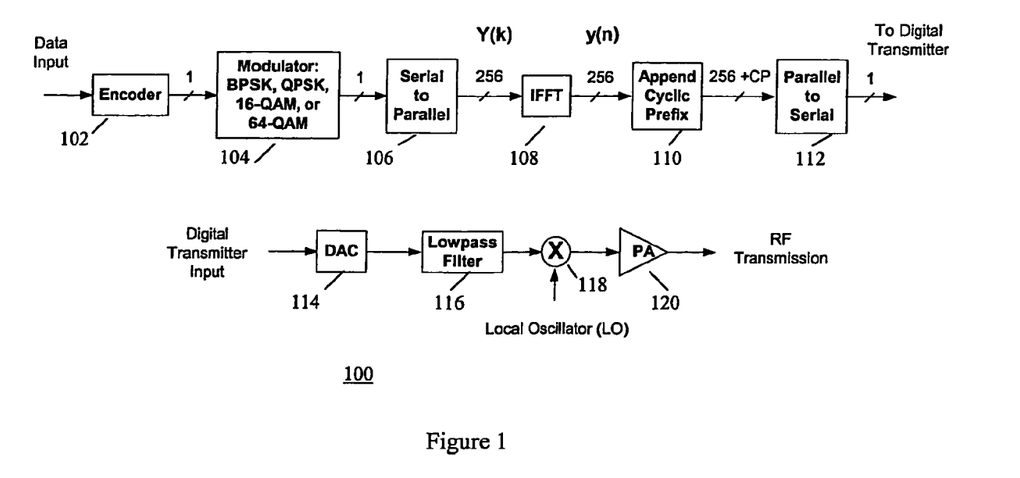
FIG. 1 shows a transmitter block diagram for RF transmission of one OFDM symbol.

Before describing in detail the CFR approaches of the present invention, an overview of an OFDM transmission system such as an example OFDM transmission system 100 in FIG. 1 will be provided. The creation of an OFDM symbol for RF transmission is shown in FIG. 1. The symbol is part of a data stream that has been encoded by an encoder 102, modulated in a modulator 104, converted from serial to parallel as a 256 sample block signal Y(k) by a serial to parallel converter 106, converted to a time domain signal y(n) using an inverse fast Fourier transform (IFFT) module 108, extended by a cyclic prefix module 110 using a cyclic prefix to 256+ CP samples, then converted back to a serial data stream by a parallel to serial converter 112. The data stream is then provided to a digital transmitter wherein it is converted from digital to analog (DAC) by a DAC module 114, lowpass filtered by a LPF 116, up converted to RF by a multiplication node 118 using an oscillator signal, then amplified by a power amplifier 120. For the crest factor reduction approaches presented later, the signals Y(k) and y(n) are important, which correspond to the Fourier domain and time domain data blocks, respectively, of an OFDM symbol.

Figure 2:
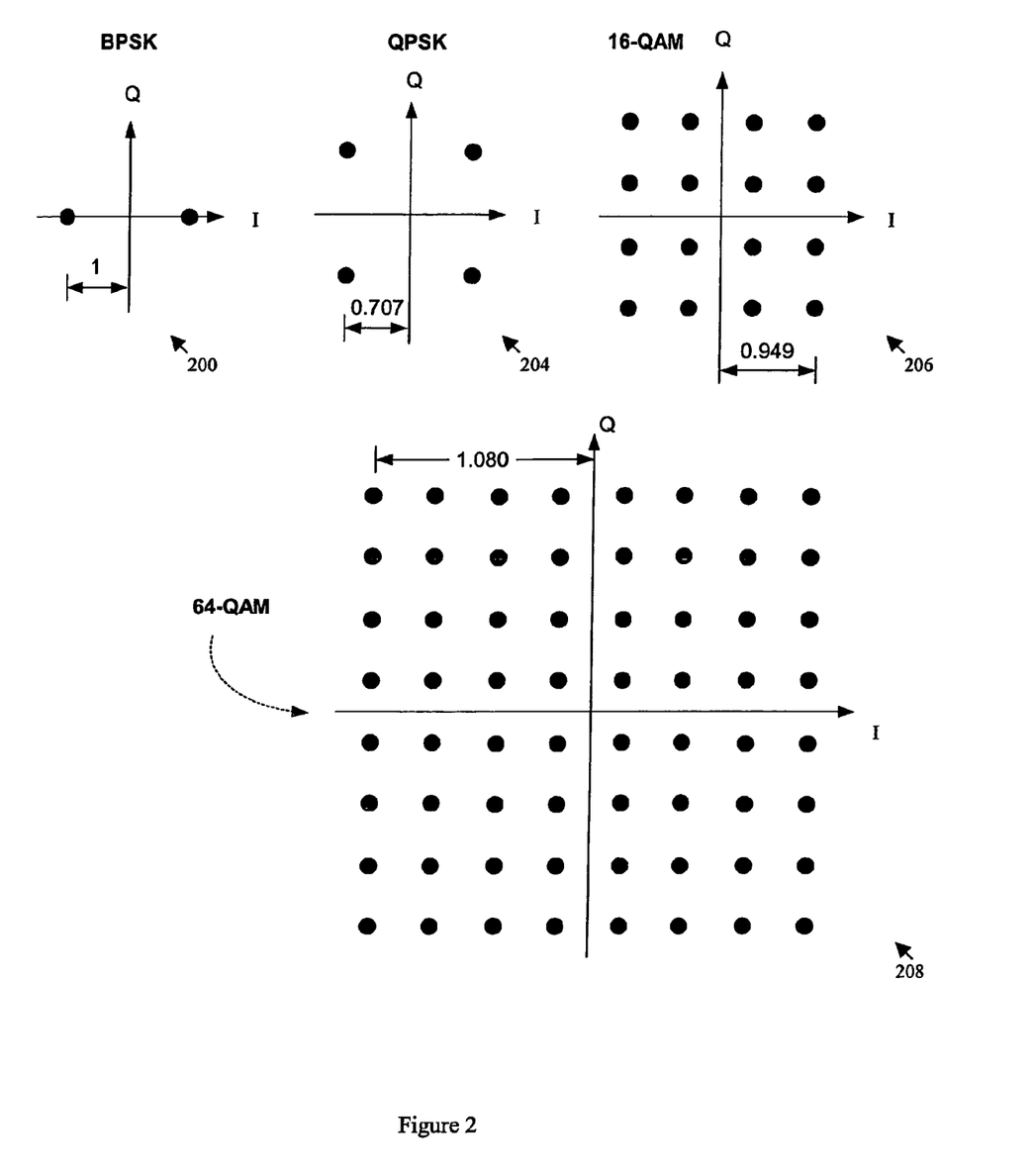
FIG. 2 shows constellations for BPSK, QPSK, 16-QAM, and 64-QAM.

The encoder 102 includes coders and interleavers to allow for error correction at the receiver. The modulator 104 allows rate changes where rate is selected to maintain a limit on the bit error rate (BER) at the receiver. The rates, for lowest to highest, are BPSK, QPSK, 16-QAM, and 64-QAM (see FIG. 2 for constellation shapes). The serial to parallel converter 106 creates a frequency representation, assigning the data to different sub-carriers (discussed below) of the OFDM signal. The IFFT module 108 transforms the data from the frequency domain to the time domain. The cyclic prefix from the cyclic prefix module 110 is a copy of the tail of the time domain block, appended to the beginning. It provides protection from ISI due to multi-path RF propagation characteristics. The cyclic time block is then converted to a serial bit stream by the parallel to serial converter 112 for input to the digital transmitter for RF transmission as an OFDM transmitted signal.

Within an OFDM symbol, the sub-carriers may be one of three types: data sub-carriers, pilot sub-carriers, or null sub-carriers. No data symbols are mapped onto the null sub-carriers, which includes the outer guard bands and the DC sub-carrier. The pilots are BPSK modulated and assigned to specific sub-carriers. The remaining sub-carriers are used for data transmission, which may be modulated using BPSK, QPSK, 16-QAM, or 64-QAM, as well known to those skilled in the art.

The OFDM transmitted signal is a sequence of symbols sent as a down-link subframe comprising a preamble, frame control header (FCH), and down-link (DL) bursts. The data modulation is QPSK for the preamble and BPSK for the FCH. The data modulation for the DL bursts may be either BPSK, QPSK, 16-QAM, or 64-QAM; however, the data modulation is the same for all symbols within a given burst (except for the BPSK pilots). The preamble and FCH are sent first. The DL-bursts are sent in order of the rate modulation rates where the lower rates are sent first.

The OFDM symbol at the output is a time domain datastream. Although the individual data sub-carriers are transmitted at equal power, the magnitude in time domain varies significantly. This is due to the IFFT operation that forms each time sample from a sum of 200 random phase variables (56 of the 256 sub-carriers are null sub-carriers). Phase alignment of sub-carriers in the frequency domain results in large peaks in the time domain.

The peak-forming phase alignment in the frequency domain differs depending on the position of the peak within the time block (after the IFFT module 108, before CP extension by the Cyclic Prefix module 110). A peak at time $t_{peak}$ within the interval t=[0,255] is maximized by the following sub-carrier phases:

$$\theta_{align(t\_peak)}(k) = -k \cdot \Delta\omega \cdot t_{peak} + \theta(t_{peak}) \quad \text{(Eq. 1)}$$

$$\Delta\omega = \frac{2\pi}{N} \quad \text{(Eq. 2)}$$

where k is the sub-carrier frequency index (DC=0), N=256, and $\theta(t_{peak})$ is the phase of the complex time sample at $t_{peak}$.

The magnitude of the sub-carriers also has an effect on peaking. Although the magnitude is constant for BPSK and QPSK modulation, it does vary between constellation elements for 16-QAM and 64-QAM cases, as shown by constellations 200-208 in FIG. 2. The larger magnitudes are found at the outer elements of the 16-QAM and 64-QAM constellations. As a result, it can be assumed that many of these outer constellation elements will be present in the data sub-carriers when a large peak appears in the time domain.

The CFR system and method of the present invention does not require the OFDM standard to be altered or additional information to be sent to the receiver. It also preserves the accuracy of the null and pilot sub-carriers by restricting constellation errors to the data sub-carriers.

The disclosed CFR system and method further restricts the constellation errors to the outer elements. For the cases of BPSK and QPSK, the outer elements include the entire constellation. For 16-QAM and 64-QAM there are 12 (of 16) and 30 (of 64) outer elements, respectively. Thus, only the sub-carriers whose data is an outer element are considered for CFR modification. The outer elements have special properties with respective to constellation errors and BER.

Figure 3:
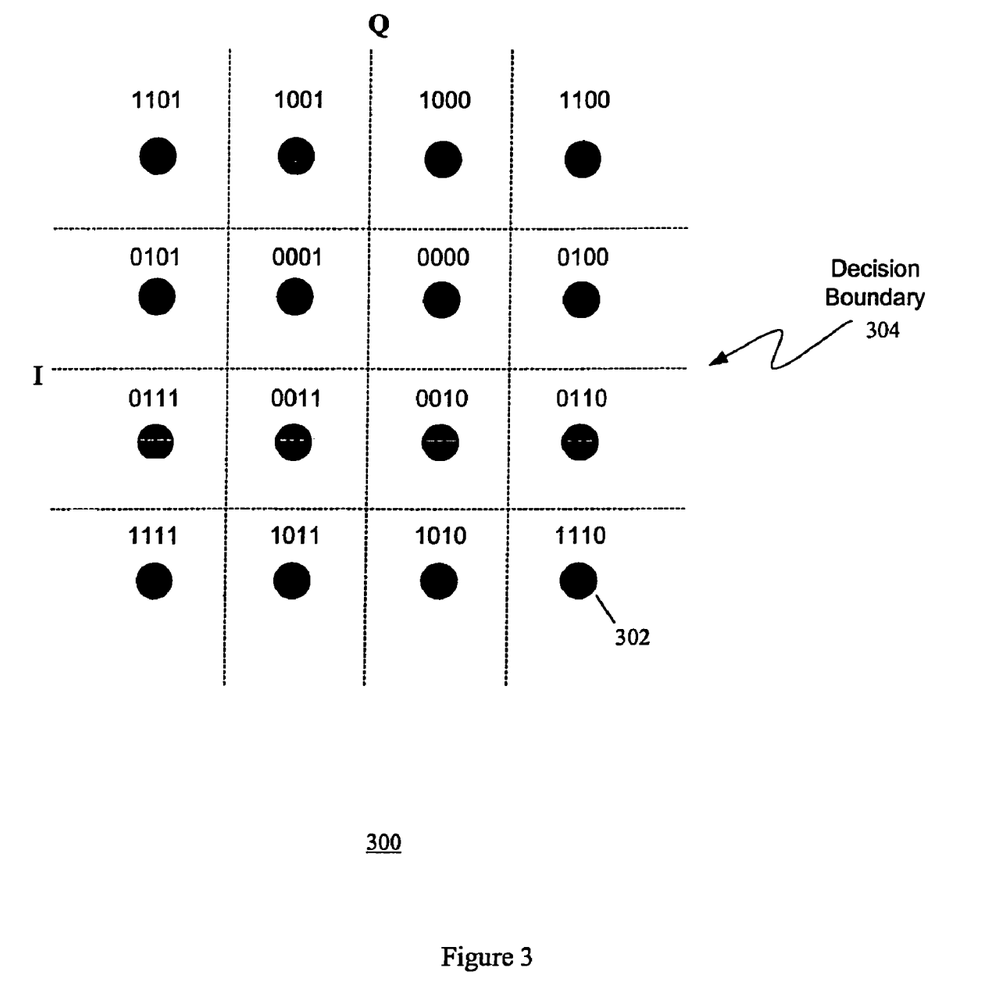
FIG. 3 shows a 16-QAM constellation Gray code mapping and decision boundaries

Consider the case of a 16-QAM constellation. The IQ mapping and the decision boundaries used by the receiver define the relationship between constellation errors and BER. The IQ mapping for the 16-QAM is a Gray code, as shown by constellation 300 in FIG. 3 including constellation elements 302 (●). Also shown in FIG. 3 are the decision boundaries 304 of the receiver. It is of interest to determine (a) the largest constellation error that can be tolerated without causing a bit error, and (b) the largest constellation error caused by a single bit error (Hamming distance between the actual and received elements is equal to one).

The largest constellation error that can be tolerated without causing a bit error depends on the position of the data element. For the case of an interior element, a single bit error occurs when the constellation error causes the received constellation element to cross one of the horizontal or vertical boundary lines 304. The distance between an interior element and the closest boundary is 0.316; however, this allowable error, which includes additive noise, is shared between the transmitter, receiver, and the propagation channel. For the outer elements, there is one direction where no decision boundary exists. It is in the outward direction away from either the I- or Q-axes, depending on the position within the constellation. At the corner elements, there are two directions unconstrained by decision boundaries. As a result, intentionally creating constellation errors for the outer elements in these unconstrained directions will not increase the BER.

Figure 4:
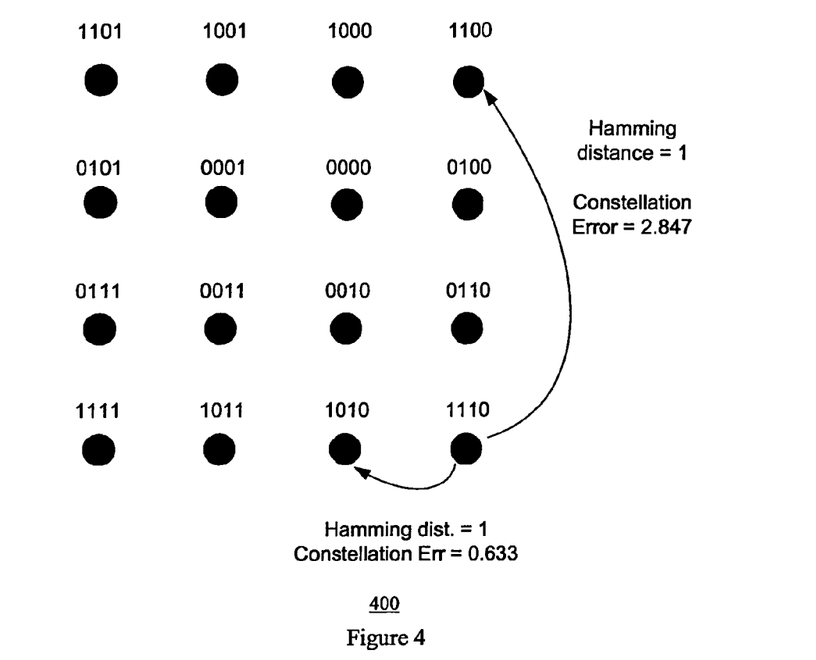
FIG. 4 shows different constellation errors for a Hamming distance.

To determine the largest constellation error caused by a single bit error, we need to look at the Gray code mapping. Neighboring elements along the horizontal and vertical directions have a Hamming distance of one. Referring to the example constellation 400 in FIG. 4, assume that both the actual and received constellation elements differ by a Hamming distance equal to one. The constellation error for an interior point is 0.633. For outer elements, a Hamming distance of one can produce a constellation error of 2.847. It is apparent that large constellation errors can be created from a single bit error on an outer element.

The CFR process creates constellation errors. The disclosed method concentrates the constellation errors to the sub-carriers that produce the least amount of BER. That is, the goal is to generate as much constellation errors as necessary for the CFR while creating the minimum Hamming distance between the actual and received elements. From the discussion earlier, it is apparent that the sub-carriers with outer constellation elements are ideal for CFR.

Two different methods may be used to achieve the CFR. The first method, referred to as the "outward enhancement," increases the I- or Q-component magnitude for all sub-carriers having an outer element and a negative correlation to the peak. The second method, referred to as a "bit reversal," reverses the sign of the I- or Q-component for the sub-carrier that has an outer element and a large positive correlation to the peak. Since the sign reversal causes a bit error, it should be used more sparingly than the outward enhancement.

In addition to reducing the peak value, it is important not to increase significantly the value of the secondary peaks in the time block. To avoid enhancing secondary peaks, certain sub-carriers are not to be used for the peak reduction. Only sub-carriers with a negative correlation to the peak and all secondary peaks are used for the outward enhancements. Only sub-carriers with a positive correlation to the peak and secondary peaks may be considered for a bit reversal. It is important to limit the number of secondary peaks specified to avoid eliminating too many sub-carriers from the CFR process.

Figure 5:
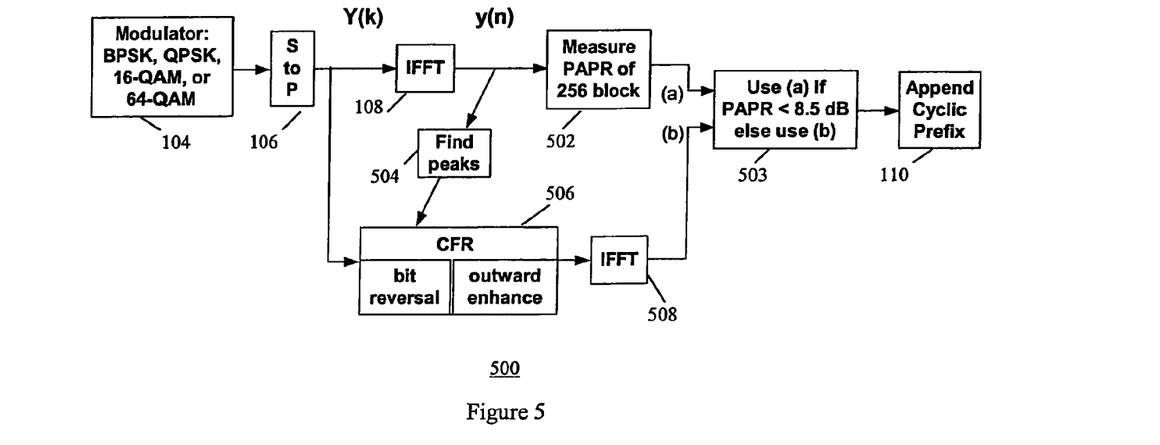
FIG. 5 shows a functional block diagram of a CFR implementation, according to an embodiment of the present invention.

A CFR implementation 500 is shown in FIG. 5. In the implementation 500, the OFDM system in FIG. 1 is modified so that the peak to average power ratio (PAPR) is measured by a PAPR measuring module 502 in the time domain, after the IFFT 108 and before the addition of the cyclic prefix 110. Before applying CFR, a peak finder 504 identifies the primary and secondary peaks within the time block. A CFR module 506 then reduces the primary peak while not increasing the secondary peaks (discussed later). The CFR is applied in the Fourier domain. The crest factor reduced signal is then converted to a time block using an IFFT module 508. Then a combiner 503 combines the original OFDM data block and the CFR OFDM data block for transmission. In the embodiment shown in FIG. 5, the combiner 503 selects the original OFDM data block for transmission, if the PAPR is small enough (less than 8.5 dB, for example). Otherwise, if the PAPR is too large, the combiner 503 selects the CFR OFDM data block for transmission. The CFR OFDM data block is not computed when the PAPR is below 8.5 dB.

Figure 6:
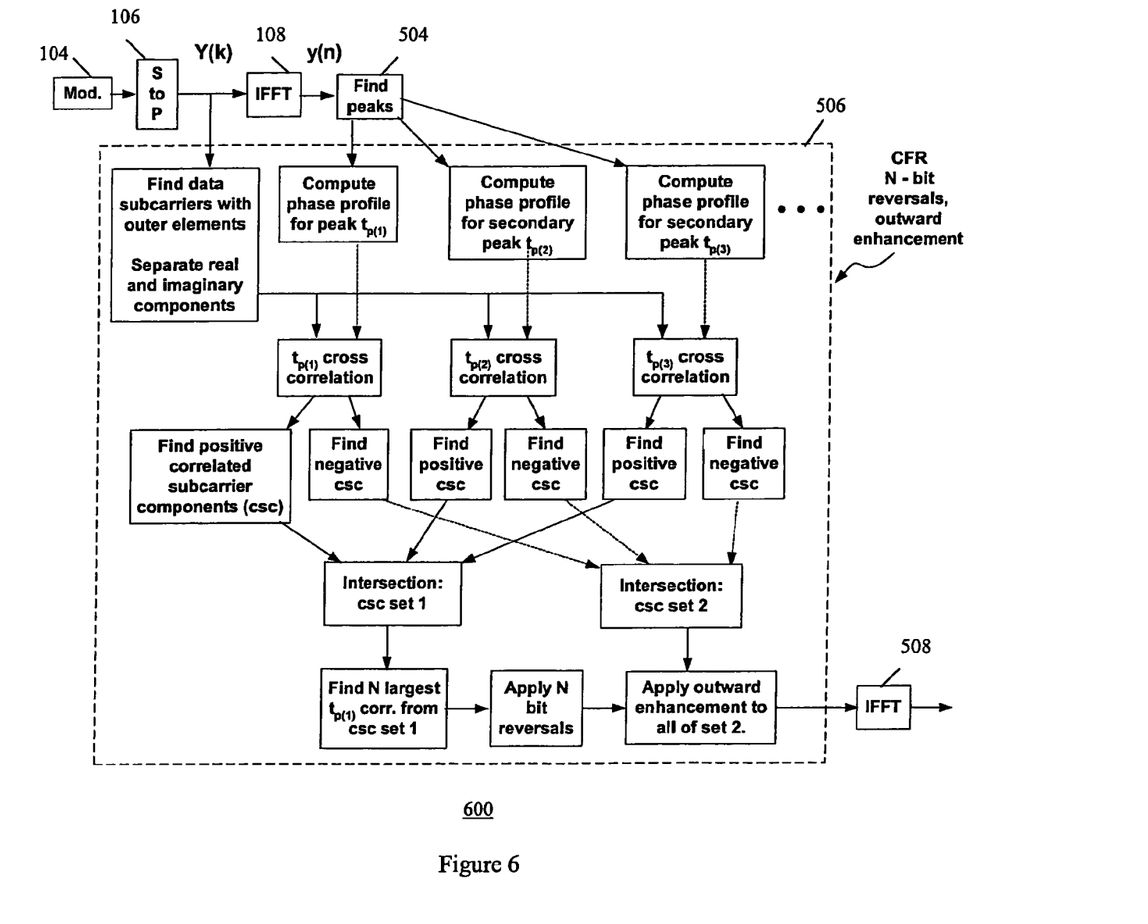
FIG. 6 shows a functional block diagram of a CFR module for the case of N bit reversals per OFDM symbol plus outward enhancement, according to an embodiment of the present invention.

The CFR module 506 is shown in greater detail in the CFR implementation 600 in FIG. 6. The CFR module 506 uses the phase alignment profile, described by (Eq. 1), for each of the primary and secondary peaks. The phase alignment profile is then cross-correlated with the real and imaginary components of the sub-carriers containing outer elements. The cross correlations for a peak $t_{peak}$ are:

$$C_{Re}(k;t_{peak}) = \text{Re}\{X(k)\} \cdot \cos\{\theta_{align(t\_peak)}(k)\} \quad \text{(Eq. 3)}$$

$$C_{Im}(k;t_{peak}) = \text{Im}\{X(k)\} \cdot \sin\{\theta_{align(t\_peak)}(k)\}. \quad \text{(Eq. 4)}$$

The peak $t_{peak}$ is formed by the difference between the positive and negative cross-correlations. Due to the phase term $\theta(t_{peak})$ within (Eq. 1), the positive cross-correlations contribute to the peak, the negative cross-correlations attenuate the peak. Applying a bit reversal (changing the sign of either $\text{Re}\{X(k)\}$ or $\text{Im}\{X(k)\}$) to a sub-carrier reverses the cross-correlation: a positive to negative change reduces the peak. Increasing the magnitude (of either $\text{Re}\{X(k)\}$ or $\text{Im}\{X(k)\}$) of a sub-carrier possessing a negative cross-correlation reduces the peak as well. In both cases, it is assumed that the amount of reduction is modest compared to the size of the peak.

There is risk that a secondary peak will increase in response to the CFR of the primary peak. It would be poor usage of bit reversals and outward enhancements if the CFR transformed a secondary peak into a primary peak. To prevent this, the cross-correlations are computed relative to the secondary peaks as well. The intersection of the sets of positive correlated components for each peak is used as a pool of available sub-carriers for a bit reversal. The available sub-carrier possessing the largest correlation to the peak is selected. The intersection of the negative correlated components for each peak is also computed. The outward enhancement is applied to all of the available sub-carrier components from the negative correlated set. The enhancement is a scalar multiple of the original value (for example, 1.03 $\text{Re}\{X(k)\}$ or 1.03 $\text{Im}\{X(k)\}$).

In this approach, secondary peaks have magnitudes that are a fraction of the primary peak where the fraction is determined by the amount of peak reduction sought from the CFR compared to the original time block. The motivation is that the potential increase in the secondary peak is directly related to the decrease in the primary peak. The threshold is raised for a given symbol if the number of peaks selected exceeds three. Currently the target PAPR is set to 8.5 dB. When the original PAPR is greater than 8.5, 9.2, or 9.7 dB, the fractional thresholds for secondary peaks are 0.85, 0.8, and 0.75 of the primary peak, respectively. These thresholds were obtained by experimentation.

Note that selecting too many secondary peaks can be problematic because the intersection of the correlated sub-carrier component sets (e.g., csc sets 1 and 2 in FIG. 6) may become a null set, preventing any CFR from occurring. Thus, in order to limit the number of secondary peaks considered, it may sometimes be necessary to increase the target PAPR for a given block (even if it results in some clipping at the power amplifier). For the rare occurrence when the threshold for secondary peaks needs to be raised, the number of bit reversals is reduced to avoid enhancing the secondary peaks excessively. In one currently preferred implementation, the fractional threshold for secondary peaks is raised until the number of selected peaks is three or less.

Since a bit reversal provides about 0.4 dB of peak reduction, typically, it is necessary to specify additional bit reversals for large peaks. In one currently preferred implementation, the number of bit reversals for an OFDM symbol is 1, 2, 3 or 4 when the original PAPR exceeds 8.7, 9.2, 9.7, and 10.1 dB, respectively. There are two approaches to implementing N bit reversals where N>1. Either all N bit reversal can be applied at once or a single bit reversal can be applied recursively N times. For the N=0 case, only the outward enhancement method is used.

Figure 7:
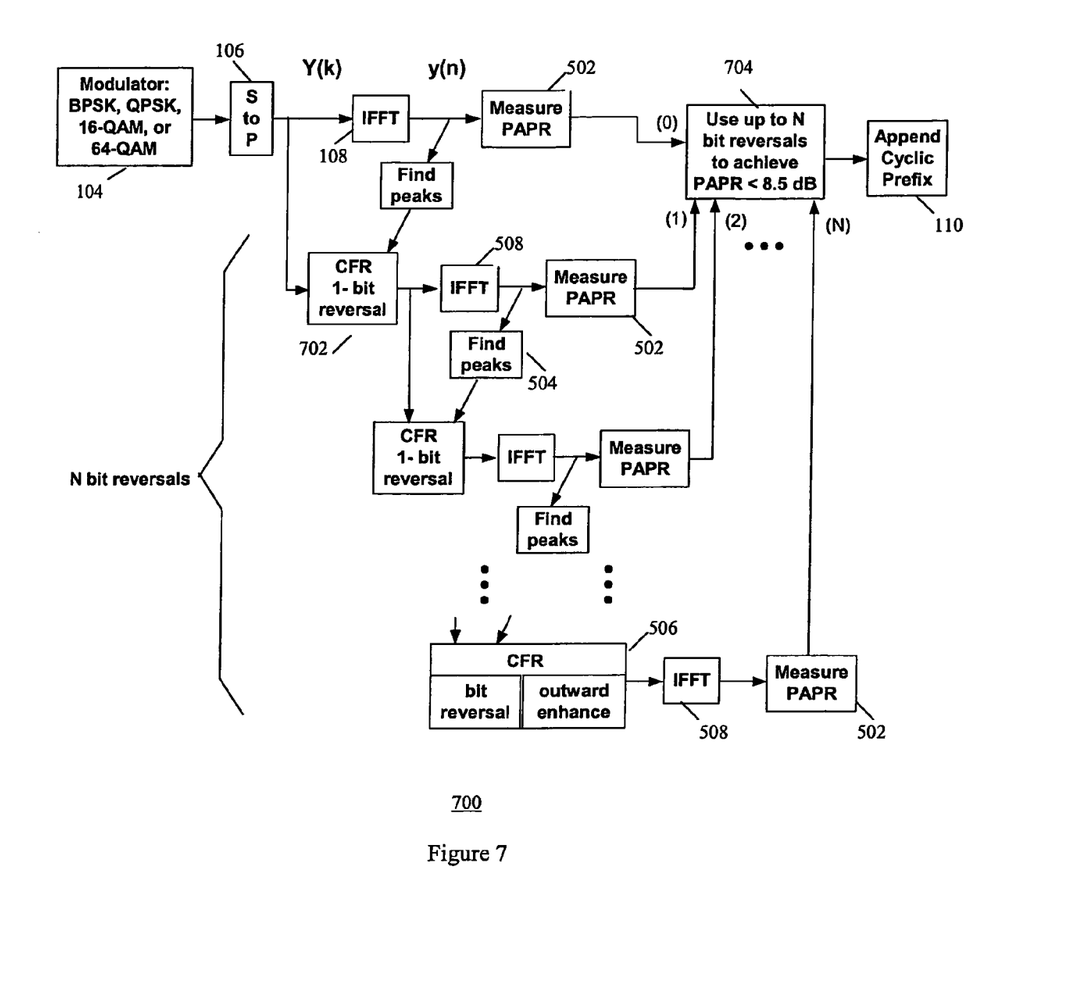
FIG. 7 shows a functional block diagram of a CFR module for the case of N bit reversals per OFDM symbol plus outward enhancement using the recursive implementation, according to an embodiment of the present invention.

The implementation 700 in FIG. 7 shows a case where single bit reversal 702 is applied recursively N times. The approach requires additional IFFT's to be computed (one IFFT per bit reversal). The primary and secondary peaks are re-computed after each bit reversal, whereby the fractional threshold for the secondary peaks can be raised to 0.85. The outward expansion should be applied after the last bit reversal has been completed. A selector 704 selects up to N bits reversals to achieve PAPR<8.5 dB.

The outward expansion is effective when many outer elements with negatively correlated sub-carrier components are available. However, this condition is not guaranteed. It is beneficial to include a third CFR approach that distributes the constellation error over all elements, not just the outer elements as in the previous two approaches. The phase profiles for the primary and secondary peaks are multiplied by scalar terms then added to the Fourier coefficients. This introduces constellation errors similar to clipping, except that the affected subcarriers can be selected. This allows the pilot and null carriers to be transmitted without error. Since the phase profiles of the primary and secondary peaks have been computed previously (see FIG. 6), the additional computational cost is minimal. The size of the scalar terms has a direct effect on the constellation error.

Figure 8:
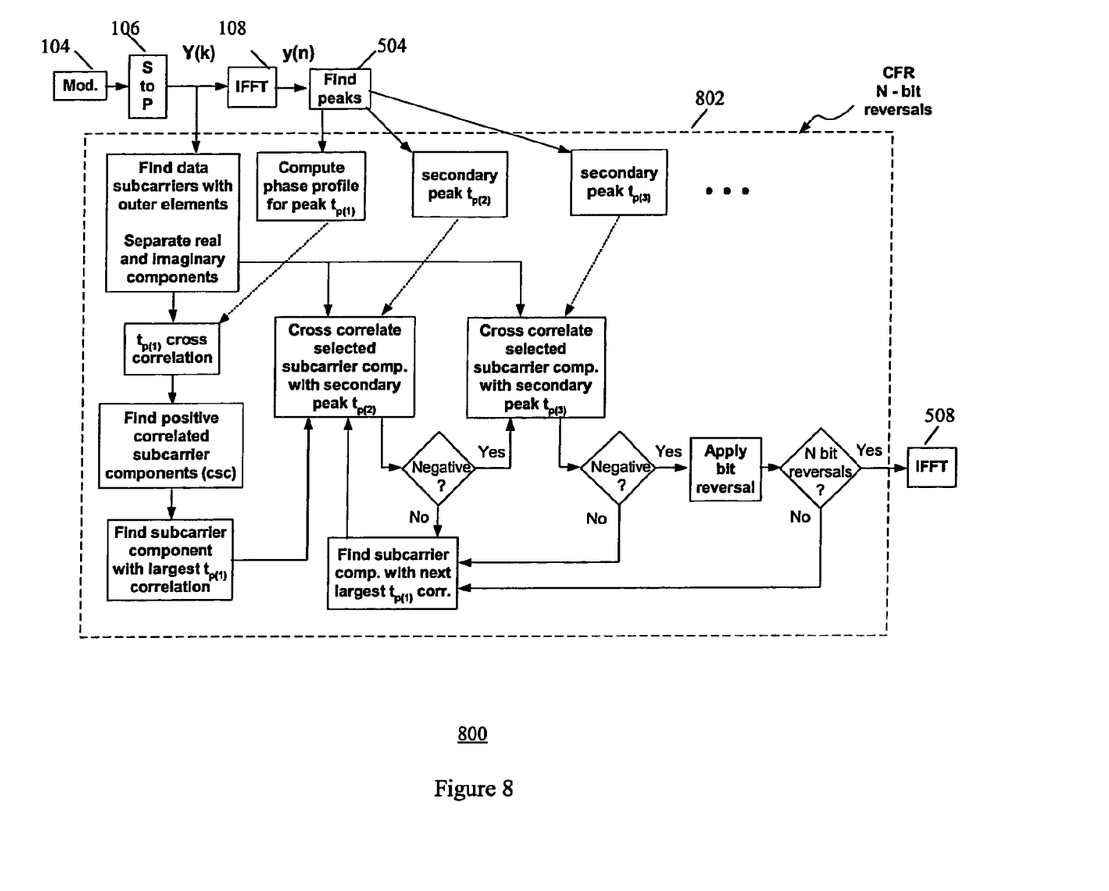
FIG. 8 shows a functional block diagram of a serial implementation of a CFR module using bit reversals only, according to an embodiment of the present invention.

A third CFR implementation 800 according to the present invention is illustrated in FIG. 8. The CFR module 506 shown in FIG. 6 computes the cross-correlation for all sub-carrier components associated with the primary and secondary peaks. In the CFR module 802 shown in FIG. 8, since only bit reversals are used for CFR, the cross-correlation for the secondary peaks are computed for the selected sub-carrier components. The CFR module 802 in FIG. 8 can be viewed as a serial implementation of the CFR module in FIG. 6, which requires fewer computations on average because the secondary peak tests are rarely exhaustive.

Next results of the CFR approach of the present invention will be described. The CFR approach is applied to an OFDM DL subframe comprising two QPSK symbols for the preamble, one BPSK symbol for the FCH, two QPSK symbols, two 16-QAM symbols, and 16 64-QAM symbols. The QPSK (excluding the preamble), 16-QAM, and 64-QAM symbols contain BPSK pilot sub-carriers. The ratio used for the cyclic prefix is 0.25, which corresponds to 64 bits for the 256 data blocks. The DL subframe is repeated 20 times with random data sent on the data sub-carriers (that is, the positions within the data constellations are selected at random).

Figure 9:
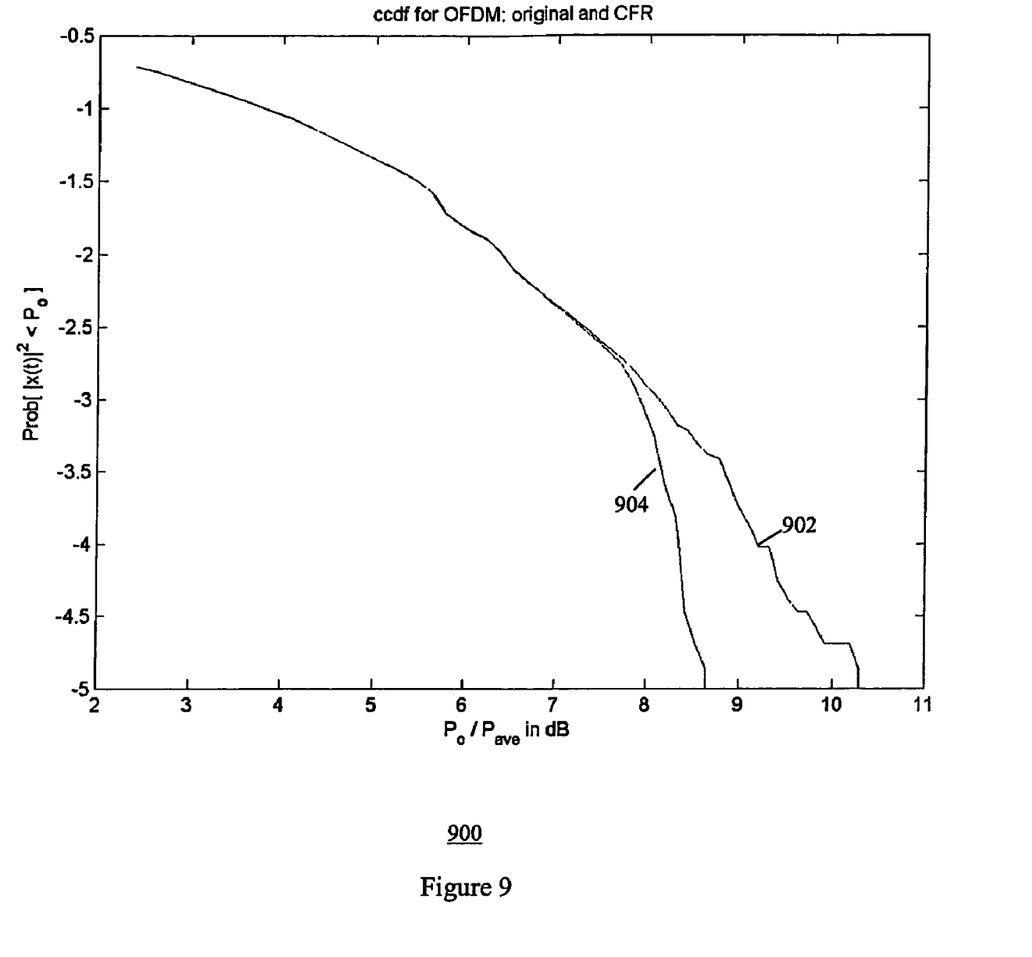
FIG. 9 shows a graph of complementary cumulative distribution function (CCDF) for an original OFDM time waveform and a crest factor reduced OFDM time waveform including cyclic prefixes according to an embodiment of the present invention.

The CFR has a target PAPR of 8.5 dB. Complementary cumulative distribution functions (CCDF's) of the original and crest factor reduced (CFR'ed) OFDM time sequences are shown in a graph 900 in FIG. 9. FIG. 9 illustrates a complementary cumulative distribution function (CCDF) for an original OFDM time waveform 902 and a crest factor reduced OFDM time waveform 904 including cyclic prefixes according to an embodiment of the present invention.

The highest peak for the CFR OFDM time sequence is 8.65 dB, reduced from 10.28 dB. The BER introduced by the CFR is 0.00022 (96 bit reversals from 424020 bits sent, not including pilots or the cyclic prefix).

Multiple iterations work well when the correction signal is additive because the residual error decreases over time. Introducing bit reversals is a discrete process, which means the process must be re-tested from the start after each iteration. It can be an exhaustive test. It is possible to select the best bit reversal then either (a) test if the secondary peaks are still lower than the reduced primary peak, or (b) test if the secondary peaks have negative correlated sub-carrier. The latter is equivalent to the current process, except it is a serial test that can be exited earlier. The reason that (b) is written as a parallel test of the secondary peaks is for ease of illustration (and it matches the Matlab code). For the (a) test, if the best bit reversal failed the secondary peak criterion, it would select the next best bit reversal and re-check for secondary peaks. It would produce better results on average, but would require an additional IFFT for each iteration, and as mentioned previously it can be exhaustive.

The approach does not attempt to achieve the lowest CFR, only producing a bounded CFR to ease the design of the PA and the digital circuitry, while generating the least amount of signal degradation. With this type of CFR, 90 percent of the CFR symbols are transmitted without modification. Only a peak-to-average measurement is required and no additional IFFT's are computed for these pass-through cases.

It will be appreciated by those skilled in the art that the foregoing detailed implementations are purely illustrative in nature and a variety of modifications are possible while remaining within the scope of the invention.

What is claimed is:

1. An OFDM communications system, comprising:
    an input receiving a modulated communications signal comprising a series of symbols;
    a serial-to-parallel converter for converting the symbols into parallel format and providing groups of plural symbols in a frequency domain;
    a circuit that receives said groups of plural symbols and converts them into time domain symbols;
    a crest factor reduction circuit that receives said groups of plural symbols in the frequency domain and reduces a primary peak therein by selective sub-carrier degradation to generate peak reduction symbols;
    a circuit for converting the peak reduction symbols into time domain peak reduction symbols;
    a combiner circuit for combining the peak reduction symbols with the time domain symbols to provide peak reduced symbols in time domain; and
    a cyclic extension circuit for performing a cyclic extension operation on the time domain peak reduced symbols.

2. The system of claim 1 wherein the crest factor reduction circuit receives said groups of plural symbols and reduces a primary peak in the groups of plural symbols while not increasing secondary peaks.

3. The system of claim 1 further comprising a circuit for determining a peak to average power ratio (PAPR) from the time domain symbols wherein the combiner includes a selector that selects a time domain symbol if the PAPR is less than a certain value, otherwise, the selector selects a peak reduction symbol.

4. The system of claim 3 further comprising a peak finder for identifying the primary and secondary peaks within the time domain symbols, wherein based on the identified primary and secondary peaks, the crest factor reduction circuit reduces the primary peak in the groups of plural symbols, to generate the peak reduction symbols.

5. The system of claim 4 wherein the crest factor reduction includes a circuit for reducing the primary peak by bit reversal for sub-carriers with a positive correlation to the primary peak and secondary peaks.

6. The system of claim 5 wherein the circuit for reducing the primary peak by bit reversal changes the sign of an I-component or Q-component for a sub-carrier that has an outer element and a positive correlation to the primary peak, for reducing the primary peak.

7. The system of claim 4 wherein the crest factor reduction includes a circuit for reducing the primary peak by outward enhancement.

8. The system of claim 7 wherein the circuit for reducing the primary peak by outward enhancement increases an I-component or Q-component magnitude for all sub-carriers having an outer modulation constellation element and a negative correlation to the primary peak.

9. The system of claim 4 wherein the crest factor reduction circuit includes a circuit for reducing the primary peak using the phase profiles of the primary and secondary peaks to offset all modulation constellation elements for the groups of plural symbols.

10. The system of claim 9 further comprising a circuit for computing the phase profiles of the primary and secondary peaks to determine the magnitude and direction of the offset of the element associated with each sub-carrier for optimal peak reduction.

11. The system of claim 1 further comprising a parallel-to-serial converter for converting an output of said cyclic extension circuit from parallel to serial format to provide a peak power reduced digital OFDM communications signal.

12. A method for peak power reduction of an OFDM wireless communications signal, comprising:
receiving an OFDM signal comprising groups of plural symbols;
converting the groups of plural symbols into time domain symbols;
reducing a primary peak in the groups of plural symbols by selective sub-carrier degradation, to generate peak reduction symbols;
converting the peak reduction symbols into time domain peak reduction symbols;
combining the peak reduction symbols with the time domain symbols to provide peak reduced symbols in time domain; and
performing a cyclic extension operation on the time domain peak reduced symbols.

13. The method of claim 12 wherein the step of reducing a primary peak further includes reducing a primary peak in the groups of plural symbols while not increasing secondary peaks.

14. The method of claim 13 further comprising the step of determining a peak to average power ratio (PAPR) from the time domain symbols, wherein the step of combining further includes selecting a time domain symbol if the PAPR is less than a certain value, otherwise, selecting a peak reduction symbol.

15. The method of claim 14 further comprising the step of:
identifying the primary and secondary peaks within the time domain symbols; and
based on the identified primary and secondary peaks, reducing the primary peak, while not increasing the secondary peaks, in the groups of plural symbols in the frequency domain, to generate the peak reduction symbols.

16. The method of claim 15 wherein the step of reducing the primary peak further includes reducing the primary peak by bit reversal for sub-carriers with a positive correlation to the primary peak and secondary peaks.

17. The method of claim 16 wherein the step of reducing the primary peak further includes reducing the primary peak by bit reversal changes the sign of an I-component or Q-component for a sub-carrier that has an outer element and a positive correlation to the primary peak, for reducing the primary peak.

18. The method of claim 15 wherein the step of reducing the primary peak further includes reducing the primary peak by outward enhancement.

19. The method of claim 18 wherein the step of reducing the primary peak further includes reducing the primary peak by outward enhancement that increases an I-component or Q-component magnitude for all sub-carriers having an outer modulation constellation element and a negative correlation to the primary peak.

20. The method of claim 15 wherein the step of reducing the primary peak further includes reducing the primary peak using the phase profiles of the primary and secondary peaks to offset all modulation constellation elements for the groups of plural symbols.

21. The method of claim 20 further comprising the step of computing the phase profiles of the primary and secondary peaks to determine the magnitude and direction of the offset of the element associated with each sub-carrier for optimal peak reduction.

22. The method of claim 13 further comprising the step of converting the result of said cyclic extension operation from parallel to serial format to provide a peak power reduced digital OFDM communications signal.

* * * * *